(12) United States Patent
Kean et al.

(10) Patent No.: US 10,072,385 B2
(45) Date of Patent: *Sep. 11, 2018

(54) EJECTOR CONTROL FOR SPREADING MATERIAL ACCORDING TO A PROFILE

(71) Applicant: Deere & Company, Moline, IL (US)

(72) Inventors: Michael G. Kean, Maquoketa, IA (US); Douglas G. Meyer, Dubuque, IA (US); Francois Stander, Dubuque, IA (US)

(73) Assignee: Deere & Company, Moline, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/785,111

(22) Filed: Oct. 16, 2017

(65) Prior Publication Data

US 2018/0051426 A1  Feb. 22, 2018

Related U.S. Application Data

(63) Continuation of application No. 15/006,533, filed on Jan. 26, 2016, now Pat. No. 9,803,324.

(51) Int. Cl.
| | |
|---|---|
| *E01C 19/20* | (2006.01) |
| *G01C 21/20* | (2006.01) |
| *G05B 15/02* | (2006.01) |
| *G01S 19/13* | (2010.01) |
| *E02F 9/20* | (2006.01) |

(52) U.S. Cl.
CPC ........ *E01C 19/2015* (2013.01); *E02F 9/2029* (2013.01); *G01C 21/20* (2013.01); *G01S 19/13* (2013.01); *G05B 15/02* (2013.01); *E01C 2019/2055* (2013.01)

(58) Field of Classification Search
None
See application file for complete search history.

(56) References Cited

U.S. PATENT DOCUMENTS

| | | |
|---|---|---|
| 1,927,653 A | 9/1933 | Wehr et al. |
| 2,663,439 A | 12/1953 | Phelps et al. |
| 3,780,955 A | 12/1973 | Palmer |

(Continued)

FOREIGN PATENT DOCUMENTS

| | | |
|---|---|---|
| CA | 1032568 A1 | 6/1978 |
| DE | 415069 C | 6/1925 |

(Continued)

OTHER PUBLICATIONS

Search report issued in application No. GB1701255.0, dated Aug. 1, 2017 (3 pages).

(Continued)

*Primary Examiner* — Krishnan Ramesh

(57) ABSTRACT

In accordance with an example embodiment, a method of operating a work vehicle with an ejector body may include receiving a position signal indicative of a position of the work vehicle, receiving a target profile indicative of a target topography for an area, receiving an ejection command at a controller and entering the controller into an ejection mode based on the ejection command, and controlling, with the controller, in the ejection mode, at least one of a speed of the work vehicle and a speed of an ejector included in the ejector body based on the position signal and the target profile, to spread a load of material from the ejector body onto a ground surface.

20 Claims, 4 Drawing Sheets

(56) References Cited

U.S. PATENT DOCUMENTS

| | | | |
|---|---|---|---|
| 3,806,042 A | 4/1974 | van der Lely |
| 4,266,731 A | 5/1981 | Musso |
| 5,393,167 A | 2/1995 | Fujita et al. |
| 5,850,341 A | 12/1998 | Fournier et al. |
| 5,964,410 A | 10/1999 | Brown et al. |
| 6,012,656 A | 1/2000 | Anderson |
| 6,079,933 A | 6/2000 | Moyna et al. |
| 6,092,973 A | 7/2000 | Burnett et al. |
| 6,227,761 B1 | 5/2001 | Kieranen et al. |
| 6,336,068 B1 | 1/2002 | Lawson et al. |
| 6,354,786 B1 | 3/2002 | Feller |
| 6,368,046 B1 | 4/2002 | Burnett et al. |
| 6,374,606 B1 | 4/2002 | Fallon et al. |
| 6,378,793 B1 | 4/2002 | Lantz |
| 6,394,735 B2 | 5/2002 | Hollinrake et al. |
| 6,446,879 B1 | 9/2002 | Kime |
| 6,517,281 B1 | 2/2003 | Rissi |
| 6,526,339 B1 | 2/2003 | Herzog et al. |
| 6,736,592 B2 | 5/2004 | Burnett et al. |
| D544,428 S | 6/2007 | Truan et al. |
| 7,484,911 B2 | 2/2009 | Frelich |
| 7,878,751 B2 | 2/2011 | Hagenbuch |
| 7,894,961 B2 | 2/2011 | Blackburn et al. |
| 7,946,787 B2 | 5/2011 | Glee et al. |
| 8,070,385 B2 | 12/2011 | Green |
| 8,160,782 B2 | 4/2012 | Harrison, Jr. |
| 8,371,769 B2 | 2/2013 | Worsley et al. |
| 9,004,811 B2 | 4/2015 | Mings et al. |
| 9,011,038 B2 | 4/2015 | Buschmann et al. |
| 9,033,611 B2 | 5/2015 | Hanfland et al. |
| 9,481,977 B1 | 11/2016 | Clar et al. |
| 9,534,349 B2 | 1/2017 | Horn et al. |
| 2003/0204297 A1 | 10/2003 | Griffith et al. |
| 2004/0173088 A1 | 9/2004 | Burnett et al. |
| 2005/0265785 A1 | 12/2005 | Kieranen et al. |
| 2006/0045620 A1 | 3/2006 | Olson et al. |
| 2006/0104404 A1 | 5/2006 | Blackburn et al. |
| 2007/0122235 A1 | 5/2007 | Kasahara et al. |
| 2008/0038059 A1 | 2/2008 | Frelich |
| 2009/0052986 A1 | 2/2009 | Hall et al. |
| 2010/0084908 A1 | 4/2010 | Montocchio |
| 2011/0015832 A1 | 1/2011 | Hoyle |
| 2012/0067980 A1 | 3/2012 | Iwano et al. |
| 2014/0180548 A1 | 6/2014 | Edara et al. |
| 2015/0267361 A1 | 9/2015 | Horn et al. |

FOREIGN PATENT DOCUMENTS

| | | |
|---|---|---|
| DE | 202007011417 U1 | 6/2008 |
| EP | 0065249 A1 | 11/1979 |
| EP | 2179637 B1 | 11/2011 |
| WO | 00/57066 A1 | 9/2000 |
| WO | 2014146683 A1 | 9/2014 |

OTHER PUBLICATIONS

Search report issued in application No. PCT/EP2013/55591, dated Dec. 4, 2013 (4 pages).

Search report issued in counterpart application No. GB1701254.3, dated Jul. 28, 2017 (3 pages).

EJECTOR CONTROL FOR SPREADING MATERIAL ACCORDING TO A PROFILE

RELATED APPLICATION

This is a continuation of U.S. application Ser. No. 15/006,533, titled "Ejector Control for Spreading Material According to a Profile," filed Jan. 26, 2016, which is hereby incorporated by reference in its entirety.

TECHNICAL FIELD

The present disclosure generally relates to a machine and a method. An embodiment of the present disclosure relates to a control system and method of control for a work vehicle with an ejector body.

BACKGROUND

Work vehicles may include beds or bins for hauling material, such as dirt, rock, sand, or other aggregate materials. The beds of these work vehicles may be unloaded (emptied) of the hauled material in different manners, including by tipping the bed to slide the material out, opening doors along the bottom of the bed so that the material may flow out, or operating an ejector mechanism which pushes the material out of the bed. These beds may also include tailgates to selectively close off an exit to the bed so as to retain material.

One example of a work vehicle with an ejector mechanism may be an articulated dump truck. Material may be loaded into a bed positioned on a rear frame of the truck at a first site, hauled by the truck to a second site, and unloaded at the second site. The material may be loaded into the truck by an excavator and unloaded from the truck by the movement of a headboard which pushes the material out of the bed of the truck.

SUMMARY

Various aspects of examples of the present disclosure are set out in the claims.

According to an aspect of the present disclosure, a method of operating a work vehicle with an ejector body may include receiving a position signal indicative of a position of the work vehicle, receiving a target profile indicative of a target topography for an area, receiving an ejection command at a controller and entering the controller into an ejection mode based on the ejection command, and controlling, with the controller, in the ejection mode, at least one of a speed of the work vehicle and a speed of an ejector included in the ejector body based on the position signal and the target profile, to spread a load of material from the ejector body onto a ground surface.

According to another aspect of the present disclosure, at least one of the speed of the work vehicle and the speed of the ejector may be controlled based on a comparison of the target profile and the position signal.

According to another aspect of the present disclosure, the speed of the work vehicle may be controlled based on the speed of the ejector and the comparison of the target profile and the position signal.

According to another aspect of the present disclosure, the speed of the ejector may be controlled based on the speed of the work vehicle and the comparison of the target profile and the position signal.

According to another aspect of the present disclosure, the method may include determining a target parameter based on a comparison of the target profile and a current profile, the current profile indicative of a current topography for the area, wherein at least one of the speed of the work vehicle and the speed of the ejector is controlled based on the target parameter.

According to another aspect of the present disclosure, the method may include determining the current profile based on a plurality of received position signals.

According to another aspect of the present disclosure, the speed of the work vehicle may be controlled based on the target parameter and the speed of the ejector.

According to another aspect of the present disclosure, the speed of the ejector may be controlled based on the target parameter and the speed of the work vehicle.

According to another aspect of the present disclosure, the method may include the step of receiving the ejection command from an input actuated by an operator of the work vehicle.

According to another aspect of the present disclosure, the method may include the step of entering the ejection mode based on a comparison of the position signal and a first position.

According to another aspect of the present disclosure, the method may include the step of exiting the ejection mode based on a comparison of the position signal and a second position.

According to another aspect of the present disclosure, the method may include the step of limiting a maximum speed of the work vehicle prior to entering the ejection mode based on the comparison of the position signal and the first position.

According to another aspect of the present disclosure, the maximum speed may be based on a comparison of the target profile and a current profile, the current profile indicative of a current topography for the area.

According to another aspect of the present disclosure, a work vehicle with an ejector body may include an engine, a transmission, a GNSS receiver configured to provide a position signal indicative of a position of the work vehicle, an ejector connected to the ejector body and movable by an actuator at an ejector speed between a retracted position and an extended position, and a controller in communication with the GNSS receiver. The controller may be configured to receive the position signal, receive a target profile indicative of a target topography for an area, receive an ejection command, enter an ejection mode after receiving the ejection command, and control, in the ejection mode, at least one of a speed of the engine, a gear selection of the transmission, and the ejector speed based on the target profile and the position signal.

According to another aspect of the present disclosure, the work vehicle may include an operator input configured to provide the ejection command when actuated and a vehicle speed sensor configured to provide the speed signal.

According to another aspect of the present disclosure, at least one of the speed of the engine, the gear selection of the transmission, and the ejector speed may be controlled based on a comparison of the target profile and the position signal.

According to another aspect of the present disclosure, the speed of the engine may be controlled based on the comparison of the target profile and the position signal.

According to another aspect of the present disclosure, the speed of the ejector may be controlled based on the speed signal and the comparison of the target profile and the position signal.

According to another aspect of the present disclosure, the controller may be further configured to determine a target parameter based on a comparison of the target profile and a current profile, the current profile indicative of a current topography for the area, and control at least one of the speed of the engine, the gear selection of the transmission, and the ejector speed based on the target parameter.

According to another aspect of the present disclosure, the controller may be further configured to determine the current profile based on a plurality of received position signals.

The above and other features will become apparent from the following description and accompanying drawings.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

Figure 1:
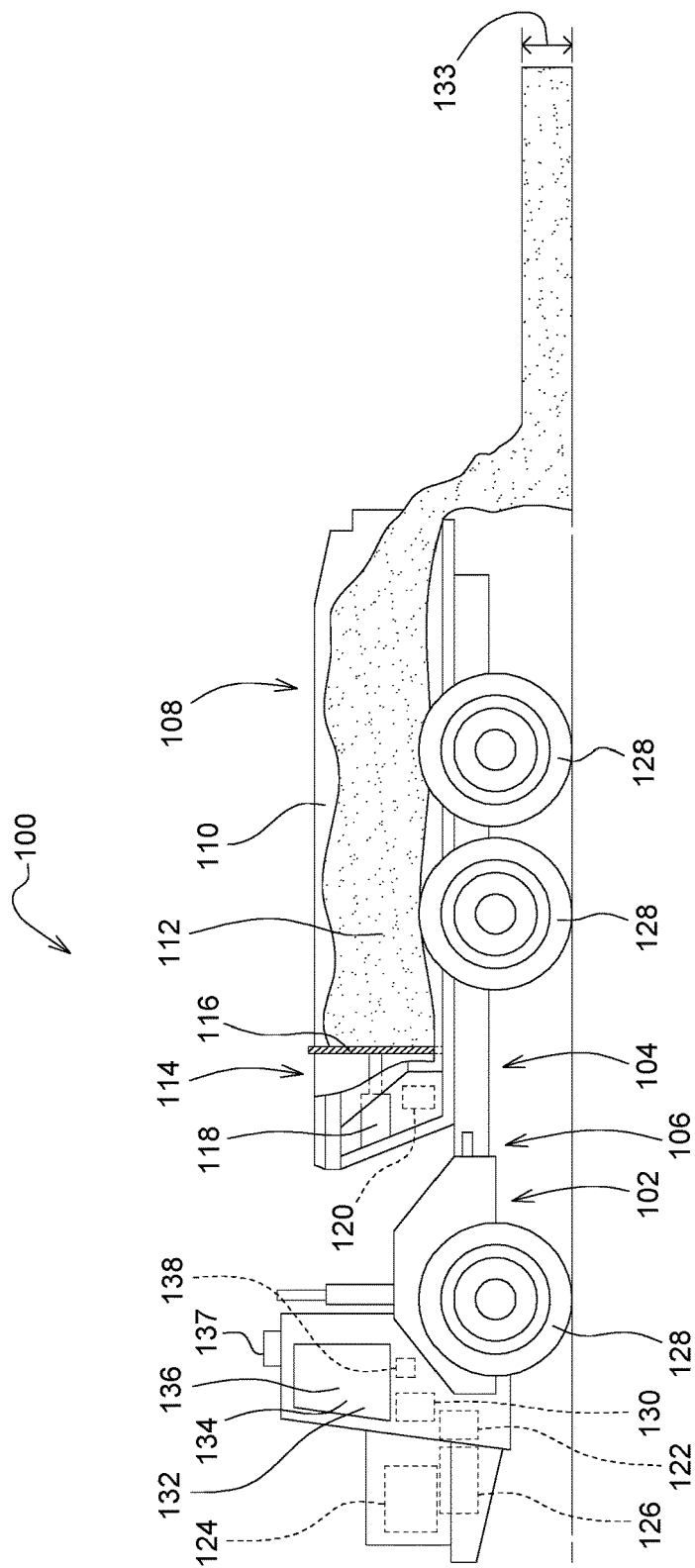
FIG. 1 is a left side view of a work vehicle with an ejector body performing a material spreading operation.

FIG. 1 illustrates an articulated dump truck 100, or ADT. ADT 100 includes a front frame 102 which is connected to a rear frame 104 via an articulation joint 106, which allows the front frame 102 to move relative to the rear frame 104 with multiple degrees of freedom to better enable the ADT 100 to traverse rough and uneven surfaces.

ADT 100 includes an ejector body 108 which is positioned on, or is integrally formed with, the rear frame 104. The ejector body 108 includes a bin 110 for holding a payload (or load), such as material 112. Although the term "bin" is used herein, the bin 110 could be any type of load-carrying body.

The ejector body 108 also includes an ejection system 114 which can selectively eject the payload from the bin 110 onto the ground behind the ADT 100. The ejection system 114 is positioned toward the front of the ejector body 108, and includes an ejector 116, which may also be referred to as a headboard, and an actuator 118. The ejection system 114 operates by having the actuator 118 move the ejector 116 rearward to force material out the rear end of the bin 110.

The ejector 116 may be supported, aligned, and oriented during this motion by a retention assembly within the bin 110. The retention assembly may be, for example, a set of guides which receive protrusions from the ejector 116, and the cooperation of the ejector 116 with these guides may keep the ejector 116 properly aligned and oriented during its movement in the bin 110. The actuator 118 is a double-acting telescoping hydraulic cylinder, but in alternative embodiments may include a non-telescoping hydraulic cylinder, a hydraulic motor, a screw or worm gear, chains, cables, or an electric motor or actuator, either alone or in combination with each other. While an articulated dump truck is illustrated in FIG. 1, the present disclosure is not limited to such a machine form and could include other machine forms with an ejector system, such as a scraper, rigid frame dump truck, on-road dump truck, or rail car.

The actuator 118 is controlled by the flow of hydraulic fluid from an electrohydraulic valve 120. The electrohydraulic valve 120 receives pressurized hydraulic fluid from a hydraulic pump 122, which is rotationally coupled to, and powered by, an engine 124 via a transmission 126. Alternatively, the hydraulic pump 122 may be directly powered by the engine 124 without an intermediate transmission. Engine 124 is disposed on the front frame 102 and powers ADT 100, including providing tractive effort delivered through transmission 126 and ground-engaging wheels 128. Transmission 126 may provide multiple speed ratios or ranges through which the engine 124 may drive the wheels 128. Examples of such transmissions include multiple gear transmissions, hydrostatic transmissions, continuously variable transmissions or infinitely variable transmission (CVT or IVT), and electrical transmissions (e.g., generator(s) and motors). Controlling the speed ratio of the transmission 126 may achieve multiple goals, including optimizing the power output of the engine 124, maximizing the efficiency of the engine 124, managing the rotational speed of the engine 124, and managing the groundspeed of the ADT 100.

The groundspeed, or speed, of the ADT 100 is measured by vehicle speed sensor 130, which senses the rotational speed of the drivetrain output of the transmission 126 and provides a signal indicative of that rotational speed. Alternatively, the speed of the ADT 100 may be measured by a rotational speed sensor placed at another portion of the drivetrain of the ADT 100, for example on one or more wheels, before or after a differential, on the input shaft to the transmission 126, on another output shaft of the transmission 126, or on an output shaft of the engine 124. In all these alternatives, the vehicle speed sensor provides a signal indicative of a speed of the ADT 100, but, depending on where such sensor is placed, the signal it provides may require further processing to arrive at the speed of the ADT 100. The signal may need to be adjusted to reflect the overall effective speed ratio between the sensor's location and the wheels and the diameter of the wheels, and may require the gathering of other variables such as the current speed ratio of the transmission 126, the state or operating parameter of a differential, or parameters indicative of rotational slippage between the sensor's location and the ground. In yet other alternatives, the speed of the ADT 100 may be measured by ground-sensing radar, calculated based on the optical flow from a camera input, or calculated based on signals received from a positioning system (e.g., Global Navigation Satellite System such as GPS or GLONASS, adaptive GPS, local positioning system, cellular positioning system, combinations of these).

The speed of the ADT 100 may be displayed on a monitor 132 located within an operator station mounted to the front frame 102. The monitor 132 may also display other information such as the gear of the transmission 126, the weight of the payload (load) being hauled by the ADT 100, or the state of the ejector body 108 or the ejector 116 (e.g., fully retracted, extending, fully extended, retracting). The monitor 132 may also be interactive, and enable an operator of the ADT 100 to edit settings or parameters associated with the ADT 100 through buttons, a touchscreen, or peripherals in communication with the monitor 132.

The monitor 132, or another monitor in the operator station, may also display the current position of the ADT 100, past or planned routes for the ADT 100, and a target profile. The target profile may be provided by a site planning or work planning file or program which indicates a target topography of the area in which the ADT 100 is operating. As a simple example, it may display a large level topography for a site where a building foundation is to be poured, even though the current topography of the site is hilly or otherwise uneven. As another example, it may display a complex topography for a site which includes roads, hills, slopes, ditches, and other three-dimensional features.

The operator may enter one or more target parameters into the monitor 132 for the operation of the ADT 100. The target parameter may indicate a target distance over which the operator desires to spread the load being hauled by ADT 100, a target thickness (which may be a minimum, average, or maximum) at which the operator desires to spread the load being hauled by the ADT 100 onto the ground, such as a thickness 133, a target speed for the ADT 100 when unloading, or a target ejection rate (which may be a minimum, average, or maximum) for the flow of material being unloaded from the ADT 100. Alternatively, such a target may be input remotely, such as by an owner, site manager, fleet manager, or other work vehicle at the work site, and communicated to the ADT 100 through a wireless signal, such as via a cellular or satellite communications network. Spreading the load of the ADT 100 over an area based on a target may provide further control over how the ADT 100 or the material is being managed which may improve the controllability or accuracy of the unloading process, or reduce the work necessary to bring the unloading area to its target profile. For example, controlling the speed of the ADT 100 and/or the ejector 116 may improve the accuracy of the unloading operation and enable the final profile of the area to more closely align with the target profile, reducing the work required by another machine such as a crawler or grader to achieve the target profile.

The operator may also utilize the monitor 132 to trigger the recording or storing of positional information of the ADT 100. When the ADT 100 is at a particular position that the operator wishes to record, for example a position or area at which the operator wishes to start an unloading process of the ADT 100, the operator may actuate an input on the monitor 132 to request that the current position be recorded. Similarly, when the ADT 100 is at a position or area which the operator wishes to record as an end point for the unloading process of the ADT 100, the operator may actuate an input on the monitor 132 to request that the current position be recorded. The actuations to record the start position and the end position may vary depending on the design of the ADT 100, including having the same actuation of the same input (e.g., a first actuation records a start position, a second actuation after the first actuation records an end position), a different actuation of the same input (e.g., a momentary actuation records a start position, a long-press actuation records an end position), or an actuation of two different inputs (e.g., actuating a first button records a start position, actuating a second button records an end position). Alternatively, the operator may actuate an input not associated with the monitor 132 to trigger the recording of positional information of the ADT 100. For example, the operator may actuate buttons/switches, dials, levers, or other touchscreens in the operator station.

The operator may control the ADT 100 through a combination of operator inputs located inside the operator station, such as throttle and brake pedals and lever 134. Lever 134 may be actuated to control the ejector 116, and in this embodiment the actuation position of the lever 134 may control the speed at which the ejector 116 moves. Actuation of the lever 134 in a first direction may cause the ejector 116 to move rearwards and unload material from the bin 110, while actuation of the lever 134 in a second direction may cause the ejector 116 to move forwards and prepare the bin 110 to receive another load of material.

The operator may also control the ejector 116 through the switch 136. In this embodiment, switch 136 is a button positioned on the lever 134, but in other embodiments it may be a detent of the lever 134 (e.g., actuating the lever 134 beyond a certain position may serve the same function as actuating the switch 136), or a user input elsewhere in the operator station. When the operator actuates the switch 136, it may activate an automated or semi-automated ejection mode for the ADT 100 in which the ejector 116 unloads the material in the bin 110. Optionally, this automated ejection mode may include returning the ejector 116 to its forward position at the end of the cycle so the ADT 100 is prepared to accept another load of material in the bin 110.

A positioning system 137 is provided on the ADT 100. In this embodiment, the positioning system is a GNSS receiver system which determines its position and communicates that position to controllers or monitors throughout the ADT 100. In other embodiments, the method or type of positioning system utilized may vary, and may include positioning systems utilizing one or more of satellite, cellular, or local positioning signals, or inertial sensors, and these systems may directly determine position or communicate with another system which determines position.

A controller 138 is also provided on the ADT 100. The controller 138 is in communication with each of the electrohydraulic valve 120, engine 124, transmission 126, vehicle speed sensor 130, monitor 132, lever 134, switch 136, and positioning system 137. Controller 138 may control the electrohydraulic valve 120 to control the flow of hydraulic fluid from the hydraulic pump 122 to the actuator 118, and thereby control the speed of the ejector 116. Controller 138 may receive signals indicative of parameters of the engine 124, such as those relating to rotational speed (speed), torque, and power, and may control certain aspects of the operation of the engine 124, such as rotational speed, torque, and power. Controller 138 may communicate with the engine 124 through intermediate components, such as an engine control unit (ECU), and thus may control the engine 124 indirectly by sending commands to the ECU, which in turn controls the engine 124. Similarly, controller 138 may receive signals indicative of rotational speed, gear or speed ratio, torque, and power of the transmission 126, and may control those some aspects of the operation of the transmission 126, including through an intermediate component such as a transmission control unit (TCU).

The controller 138 may receive a speed signal from the vehicle speed sensor 130 indicative of a speed of the ADT 100. The speed signal may be communicated in any of a number of different formats, such a voltage signal, a current signal, a pulse or count signal, or a message such as a controller area network (CAN) message. Depending on the nature of the speed signal, the controller 138 may have to further process the signal to determine an estimated speed of the ADT 100, such as by looking up a speed value in a table which correlates the speed signal to actual speed, adjusting the speed signal by constants such as the speed ratio of differentials or other drivetrain components, or by utilizing the speed signal in a multiple variable equation involving other variables such as transmission gear and slip ratios to determine speed.

The controller 138 also receives position information from the positioning system 137, such as via a CAN message. Alternative positioning systems including local positioning systems utilizing signals from multiple local transmitters to determine position, cellular positioning systems which utilize signals from local cellular towers to determine position, and adaptive positioning systems which utilize signals from multiple different positioning systems to determine position more accurately than a single system could provide (e.g., utilizing GNSS and refining the signal with local transmitters or cellular signals). The controller 138 may utilize this position information when recording start and end positions for an unloading process, to initiate and terminate an unloading process automatically when the ADT 100 reaches a start or end position, to determine a current profile of an area, or to determine where the ADT 100 is positioned relative to a target profile in order to determine an appropriate speed for the ejector 116.

The controller 138 may also communicate with another controller located on the ADT 100 or through a cellular or satellite communication system to a controller located remotely, such as a server or a device operated by a remote owner, operator, or fleet manager. Communication with such controllers may be utilized to set certain parameters of the controller 138, such as the start and end positions for an unloading process or a target parameter (distance, thickness, vehicle speed, ejector speed), or for the controller 138 to report out parameters of the operation of the ADT 100, such as the payloads hauled, the route taken, the areas which received unloaded material.

Figure 2:
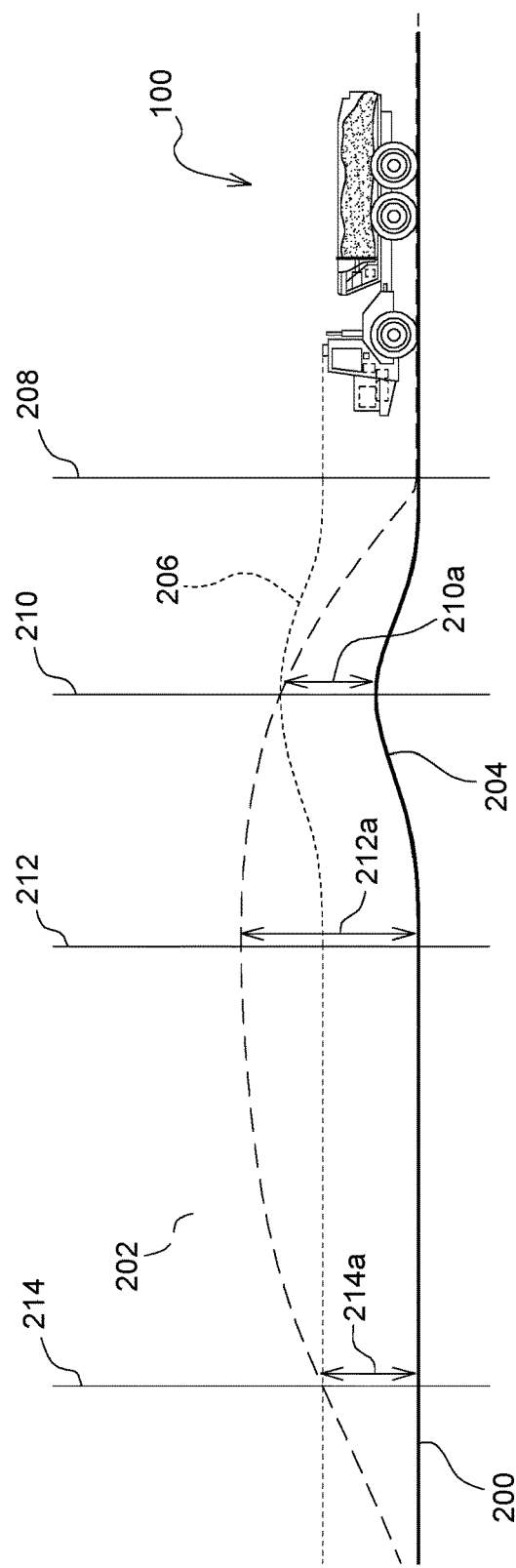
FIG. 2 is a side view of the work vehicle operating at an unloading site.

FIG. 2 illustrates an example unloading area for the ADT 100. The example unloading area is shown in two dimensions, but the concept can be extended to more complex three-dimensional profiles and features.

A current profile 200 illustrates the current surface of the ground in the unloading area, while a target profile 202 illustrates the desired surface of the ground in the same area. In this example, a feature 204 (a hill) already exists but will incorporated into a larger feature in the target topography of target profile 202. The target profile 202 may be received by the ADT 100, such as by the controller 138, from the output of site-planning software.

The sensed profile 206 is a plurality of received position signals from positioning system 137. In this embodiment, the controller 138 may determine or update the current profile 200 by storing a plurality of position signals as the ADT 100 drives across the unloading area. Updating the current profile 200 with data from the positioning system 137 may be useful if the current profile 200 has been changed since the work site was last surveyed, for example by other work vehicles or by prior unloading passes of the ADT 100. The sensed profile 206 may indicate a plurality of positions of the positioning system 137, and may need to be adjusted to determine or update the current profile 200, such as by applying an offset to the sensed positions.

As the ADT 100 drives over the unloading area, the operator may initiate an ejection by pressing the switch 136, thereby causing the controller 138 to enter into an ejection mode, or the controller 138 may enter the ejection mode based on the position of the ADT 100, such as when it comes within a certain distance of a start position 208. At the start position 208, the controller 138 controls ejector 116 via the electrohydraulic valve 120 and actuator 118 to begin ejecting material out of the bin 110. As the ADT 100 travels from the start position 208 to the second position 210, the controller 138 controls at least one of the speed of the ejector 116 and the speed of the ADT 100 based on the target profile 202 in that area. In this embodiment, the controller 138 is configured to eject material at a thickness based on a comparison of the target profile 202 and the current profile 200 in the area the ADT 100 is traversing, in order to build up the current profile 200 to reach the target profile 202. If only one unloading pass will be made, the controller 138 may be configured to eject material at a thickness equal to a distance 210a between the current profile 200 and the target profile 202. If multiple unloading passes will be necessary in order to reach the target profile 202, such as is illustrated in FIG. 2, the ADT 100 may unload material at a thickness which is based on the distance 210a, such as being proportional to the distance 210a, or a maximum, average, or minimum thickness if such a target parameter is set.

As the ADT 100 continues to traverse the unloading area, the controller 138 continues to control at least one of the speed of the ejector 116 and the speed of the ADT 100 to unload material based on the position of the ADT 100 and the target profile 202. As the ADT 100 approaches a third position 212, the controller 138 increases the thickness of the material unloaded by increasing the speed of the ejector 116 or decreasing the speed of the ADT 100. Further, as the ADT 100 approaches a fourth position 214, the controller decreases the thickness of the material unloaded by decreasing the speed of the ejector 116 or increasing the speed of the ADT 100. The ADT 100 may then reach an end position (not shown) where the controller 138 ceases unloading by the ejector 116, and may optionally initiate a retraction sequence for the ejector 116 to return it to an unloaded position.

While the embodiment illustrated in FIG. 2 involves the unloading of material based on the difference between a target profile and a current profile, in alternate embodiments the unloading may be based on different parameters. As one example, the target profile may be result in a series of values for an area, such as 0, 6, 12, and 4 for positions 208, 210, 212, and 214 respectively. In such an example, the controller 138 may control at least one of the speed of the ejector 116 and the speed of the ADT 100 to unload material at a thickness based on these values (e.g., 0", 6", 12", and 4" thicknesses), without reference to a current profile.

Figure 3:
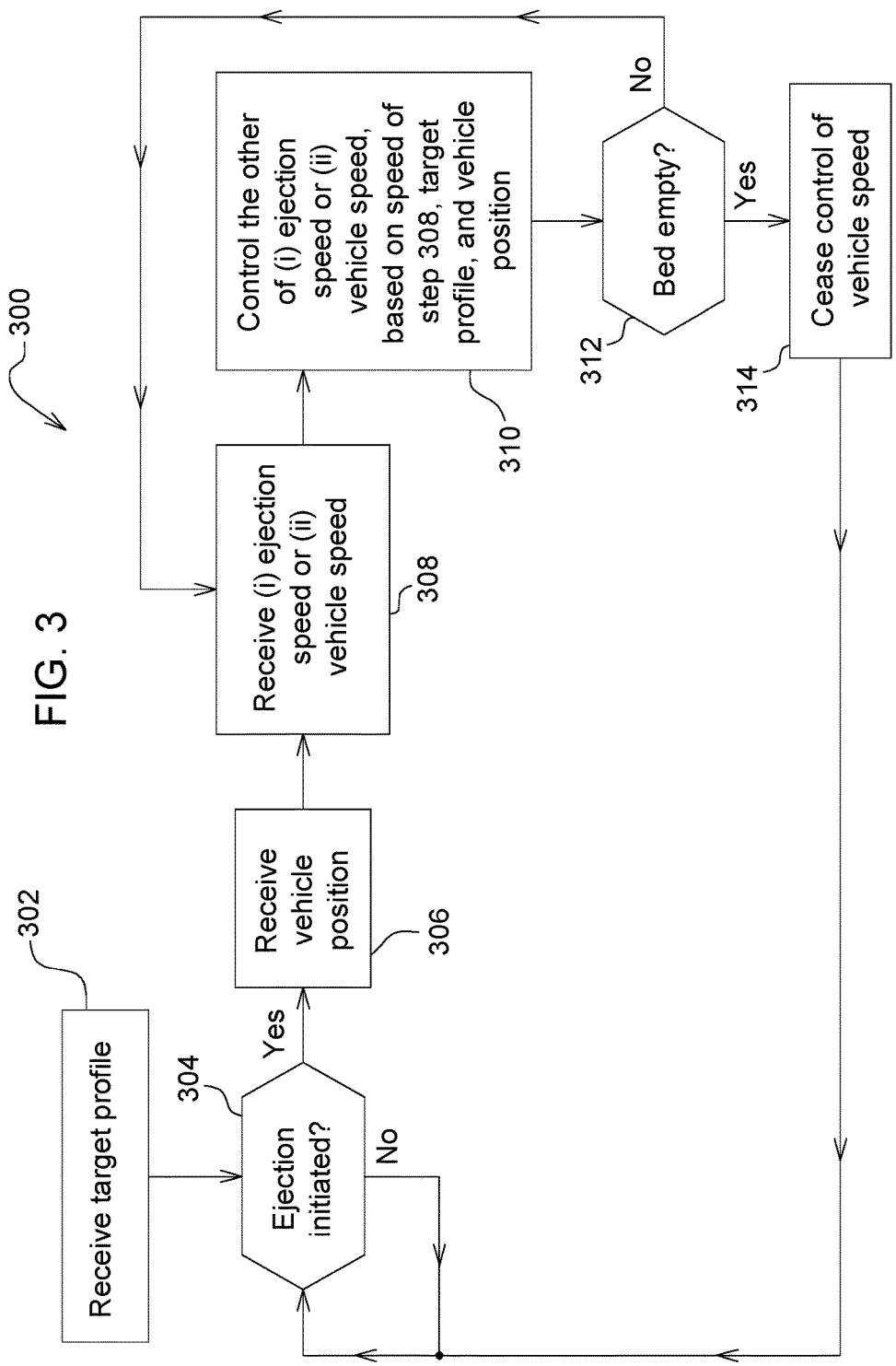
FIG. 3 is a flowchart of a system and method for ejecting material from the work vehicle.

FIG. 3 illustrates a flowchart of a control system 300 that the controller 138 may execute in order to spread material at an unloading area based on a target profile. In step 302, the controller 138 receives a target profile. The target profile may be communicated to the controller 138 by operator input or connection of portable storage to a port in communication with the controller 138, or may be loaded from a server or device via wireless communications. While this embodiment involves a target profile which is the final desired topography of an area, in alternate embodiments, the target profile may indicate a plurality of target thicknesses for an area rather than the final topography for an area.

In step 304, the controller 138 determines whether an ejection has been initiated. In control system 300, the controller 138 performs this step by determining whether it has received an ejection command from an operator. For the control system 300, the ejection is initiated when the operator actuates the lever 134 in a direction which indicates that the ejector 116 should eject material from the bin 110. In alternate embodiments, an operator may actuate the switch 136 in order to give such an ejection command. In other alternate embodiments, the controller 138 may generate or provide the ejection command to itself, and in such embodiments the controller 138 is still said to receive such an ejection command, even if the ejection command was generated within the controller 138 and was never communicated external to the controller 138. As one example, the controller 138 may initiate an ejection if the position of the ADT 100 is within a certain distance of a start position, such as start position 208 in FIG. 2. If the controller 138 receives an ejection command, it enters an ejection mode and proceeds to the unloading process of steps 306, 308, 310, and 312. If the controller 138 does not receive an ejection command, it loops step 304 until it does receive such a command.

As an optional step, the controller 138 may compare the position of the ADT 100 to a start position such as position 208 of FIG. 2, and control the speed of the ADT 100 as it approaches the start position. For example, as maximum speed of the ADT 100 may be limited as a function of its proximity to the start position, so that its maximum speed is 30 kilometers per hour when within 25 meters of the start position, 15 kilometers per hour when within 10 meters of the start position, and 10 kilometers per hour within a meter of the start position.

In step 306, the controller 138 receives a position of the ADT 100, such as from the positioning system 137. The positioning system 137 may directly communicate its position, such as through a Controller Area Network (CAN) message, or it may communicate one or more signals which the controller 138 further processes to determine a position. In the embodiment illustrated in FIG. 2, the positioning system 137 is a GNSS receiver capable of receiving satellite signals and processing those signals to determine its position, which is communicates to the controller 138 through a CAN message.

In step 308, the controller 138 receives the speed of the ejector 116 or the speed of the ADT 100. It may receive the speed of the ejector 116 by receiving a signal indicative of the actuation of the lever 134 and determining the speed which such a signal commands for the ejector 116, or by directly measuring the speed of the ejector 116 such as through one or more position or velocity sensors. Similarly, the controller 138 may receive the speed of the ADT 100 by receiving a signal indicative of the actuation of an accelerator pedal and determining the speed which such a signal commands for the ADT 100, or by directly measuring the speed of the ADT 100 such as via the vehicle speed sensor 130. Alternatively, rather than receiving the relevant speed from an operator input, the speed of the ejector 116 or the speed of the ADT 100 during an unloading cycle may be a preset value, operator-selectable, dynamically calculated based on the parameters of the ADT 100's operation or environment, or externally provided to the ADT 100 such as via wireless communications with a remote server or device. As used herein, the "speed" of the ejector references a linear speed such as 1 meter per second, but can also reference a cycle time such as 10 seconds although adjustments would need to be made in how the speed is utilized in calculations and determinations.

In step 310, the controller 138 controls the other of the speed of the ejector 116 or the speed of the ADT 100. If the controller 138 received the ejection speed in step 308, it would control the vehicle speed in step 310. If the controller 138 received the vehicle speed in step 308, it would control the ejection speed in step 310. In this way, one of the two speeds is controlled by the operator (or preset, operator-selectable, dynamically calculated, or externally provided), while the other is controlled by the controller 138 based on the speed received in step 308, the target profile received in step 302, and the position received in step 306. In controlling the vehicle speed or ejection speed, other parameters may be used by the controller 138 to refine its speed control. For example, when controlling vehicle speed the controller 138 may utilize data regarding engine load, available engine torque, gear selection, and vehicle incline to improve its control of the vehicle speed to a specific value or range of values. As another example, when controlling the speed of the ejector 116, the controller 138 may utilize data regarding payload, hydraulic pressure, pump capacity, or the current stage of the multi-stage actuator 118 in order to improve its control of the ejection speed to a specific value or range of values and reduce variances.

In alternate embodiments, the controller 138 may not receive a speed in step 308, but may instead dynamically control both the ejection speed and the vehicle speed in step 310. As one example, the controller 138 may determine a vehicle speed suitable for the conditions of the unloading area, and then control the ejection speed based on that vehicle speed. As another example, the controller 138 may determine the ejection speed appropriate for the position of the actuator 118 or the load in the bin 110, and then control the vehicle speed based on that ejection speed.

In step 310, the controller 138 controls the speed (either the ejection speed or the vehicle speed) based on the speed received in step 308, the target profile received in step 302, and the vehicle position received in step 306. As ADT 100 traverses the unloading area, the controller 138 will compare its position with the target profile to determine the target thickness at which material should be unloaded. As described with regard to FIG. 2, the controller 138 may do this in a number of ways, including by unloading at a thickness equal to the distance between the target profile and the current profile at that position (e.g., distance 210a), a thickness proportional or positively related to the distance between the target profile and the current profile at that point, or at a thickness specified in the target profile for that position, to name just a few options.

Upon determining the target thickness at the position of the ADT 100, or at a position which the ADT 100 is approaching, the controller 138 determines the necessary speed for the ejector 116 or the ADT 100 to achieve that thickness, based on the speed received in step 308. The thickness at which material in the bin 110 is spread depends on the distribution of material in the bin 110, the speed at which the ejector 116 is operating and moving material out of the bin 110, and the ground speed of the ADT 100. In many operations, the distribution of material in the bin 110 is a given variable by the time the ADT 100 is ready to begin the unloading process, and cannot be controlled, so control of the thickness at which material is spread depends on control of the other two variables (ejection speed and vehicle speed) or sensing of one of the two variables and control of the other variable based on the sensed variable. In alternative embodiments, sensors may be installed and configured to determine the distribution of material in the bin 110, and this information may be used to refine the control of the speed of the ADT 100 to more closely achieve the target thickness for uneven distributions in the bin 110.

The following example assumes that an ejection speed is received in step 308, such as an ejection speed based on an operator's actuation of the lever 134, but the reverse may also occur (i.e., the controller 138 receives the vehicle speed in step 308 and controls the ejection speed in step 310). The ejection speed is received in step 308, so the controller 138 controls the speed of the ADT 100 in step 310 to achieve the target thickness by, for example, controlling a speed, torque, or power of the engine 124, a rotational speed, gear or speed ratio, power, or torque of the transmission 126, a retarder connected to the drivetrain and designed to controllably slow the drivetrain, an engine brake, service brakes, or a combination of these. For example, the controller 138 may control the speed of the ADT 100 by limiting the maximum speed of the engine 124 and controlling which gear/speed ratio may be utilized for the transmission 126. Such control may not always achieve the target thickness, for example if the operator of the ADT 100 does not actuate the throttle pedal far enough to bring the ADT 100 to the maximum speed, the speed of the ADT 100 will fall below the control speed and the ejector 116 will eject material at a thickness greater than the target thickness. As an alternative speed control, the controller 138 may directly set the speed of the engine 124 and the gear/speed ratio of the transmission 126, thereby preventing the ADT 100 from going over or under the control speed and leaving the operator to control just the speed of the ejector 116 (via actuation of the lever 134) during the unloading process. As another alternative speed control, the controller 138 may set the gear/speed ratio of the transmission 126 and allow the operator to control the speed, torque, or power of the engine 124, thereby limiting the speed of the ADT 100 to a speed associated with that gear/speed ratio and the maximum speed of the engine 124, but not ensuring that the ADT 100 reaches that speed. As another alternative speed control, the controller 138 may limit the speed of the engine 124 and selectively engage a retarder if the ADT 100 exceeds the control speed, thereby preventing the speed of the ADT 100 from exceeding the control speed when there is an overrunning load on the powertrain, which may result if the ADT 100 is unloading while traveling down a steep incline.

To control the speed of the ADT 100, the controller 138 correlates the speed of the ejector 116 with an ejection rate of material out of the bin 110. There are multiple approaches to determining this correlation. As an example, the effective cross-sectional area of the bin 110 can be stored in the controller 138, and this cross-sectional area can be multiplied by the speed of the ejector 116 to arrive at a volumetric material ejection rate. As another example, this calculation may be simplified to two dimensions (which may be appropriate if the width of material unloaded and the internal width of the bin 110 are similar) if the effective height of the material in the bin 110 is stored in the controller 138 and multiplied by the speed of the ejector 116 to arrive at an ejection rate. These effective cross-sectional areas and effective heights can also be adjusted to account for incomplete loads. For example, the weight of the payload may be sensed and compared to a default weight when the bin 110 is full, and then the effective cross-sectional area and effective height can be adjusted accordingly such that a 75% full bin 110 results in 75% of the effective cross-sectional area or 75% of the effective height. As another example, the weight of the payload and the estimated material density may be utilized to estimate the volume of the load in the bin 110. As another example, an optical, radio, or other sensor may be configured to observe the interior of the bin 110 and estimate the volume, height, and/or distribution of material within the bin 110. As another example, empirical, modeled, or calculated data on the material ejection rates for various speeds of the ejector 116 may be gathered and used, such as in a look-up table, to correlate the ejection rate with a speed of the ejector 116. As yet another example, the material flowing out the back of the bin 110 may be directly sensed, such as by an optical, radio, or other sensor, and this material flow rate may be used to control the speed of the ejector 116 or the ADT 100.

The controller 138 then uses the ejection rate to control the speed of the ADT 100. If a volumetric ejection rate was determined, then the rate may be divided by the width over which the material is spread out the back of the bin 110 and the target thickness to find the control speed for the ADT 100. If the material ejection rate was determined in two dimensions, then the rate may be divided by the target thickness to find the control speed for the ADT 100. Depending on the configuration and state of the ADT 100, this calculation may be complicated if the speed of the ejector 116 is dependent on the speed of the engine 124. For example, the speed of the ejector 116 may increase as the rotational speed of the hydraulic pump 122 increases along with the speed of the engine 124. This dependency can be addressed in multiple ways. As one way, the controller 138 can loop through steps 306, 308, 310, and 312 until the proper ratio of the speed of the ADT 100 to the speed of the ejector 116 is reached. As another way, the controller 138 can utilize known relationships between the speed of the engine 124, the gear/speed ratio of the transmission 126, the speed of the ejector 116, and the speed of the ADT 100 to select a speed of the engine 124 and a gear/speed ratio of the transmission 126 at which the speed of the ejector 116 and the speed of the ADT 100 result in the target thickness, and command that speed for the engine 124 and that gear/speed ratio for the transmission 126.

As an alternative to the above calculations, the correlation between the speed of the ejector 116 and the thickness of the material unloaded by the ADT 100 may be pre-calculated and stored on, or made accessible to, the controller 138. Empirical, modeled, or calculated data on the thickness which results from various combinations of the speed of the ADT 100 and the ejector 116 may be stored on, or made accessible to, the controller 138, such as in a look-up table. The controller 138 may then look up the appropriate speed of the ADT 100 using the target thickness and the speed of the ejector 116. Once the control speed for the ADT 100 is determined in step 310, the controller 138 utilizes it to control the speed of the ADT 100 by controlling the engine 124, the transmission 126, a retarder, an engine brake, or service brakes. While the speed of the ADT 100 relative to the speed of the ejector 116 is referenced above, it would be equivalent in many regards to reference the speed of the ADT 100 relative to the ejection command, with the ejection command being adjusted according to other operating parameters (e.g., speed of the engine 124, gear/speed ratio of the transmission 126) or with the ejection command being used in a look-up table associating ejection command, speed of the ADT 100, and target thickness.

In step 312, the controller 138 determines whether the bin 110 of the ADT 100 is empty. The controller 138 may make this determination based on feedback signals, such as those received from one or more sensors configured to determine the position of the ejector 116 or actuator 118 (e.g., linear transducers, cylinder displacement encoders), or a sensor or switch configured to measure when the pressure applied to extending the actuator 118 indicates that the end of travel has been reached. Alternatively, the controller 138 may make this determination in an open-loop, for example by estimating the position of the ejector 116 based on the commands sent to, or the spool positions of, the electrohydraulic valve 120, the pressures of the electrohydraulic valve 120 or the actuator 118, and the times over which these commands, positions, and pressures occurred. If the bin 110 is not empty, the controller loops through step 308 and step 310 before returning to again check the status of the bin 110 at step 312.

As an alternate to step 312, the controller 138 may compare the position of the ADT 100 to an end position, and exit the ejection mode when the ADT 100 reaches the exit position or within a certain distance of the exit position.

If the bin 110 is empty, the controller 138 proceeds to step 314, where it ceases to control the speed or speeds it was controlling in step 310 and returns to step 304. In alternate embodiments, the ejection (or unloading) mode of steps 308, 310, and 312 may also be exited, and control may proceed to step 314, based on an interrupt. An interrupt could include an input from the operator, such as an actuation of the lever 134 or the switch 136, the actuation of an accelerator or brake pedal, or the detection of an error or an abnormal or undesirable operating condition for the ADT 100. Although the control system 300 returns to step 304 after step 314, provision may be made to perform step 302 upon demand.

Figure 4:
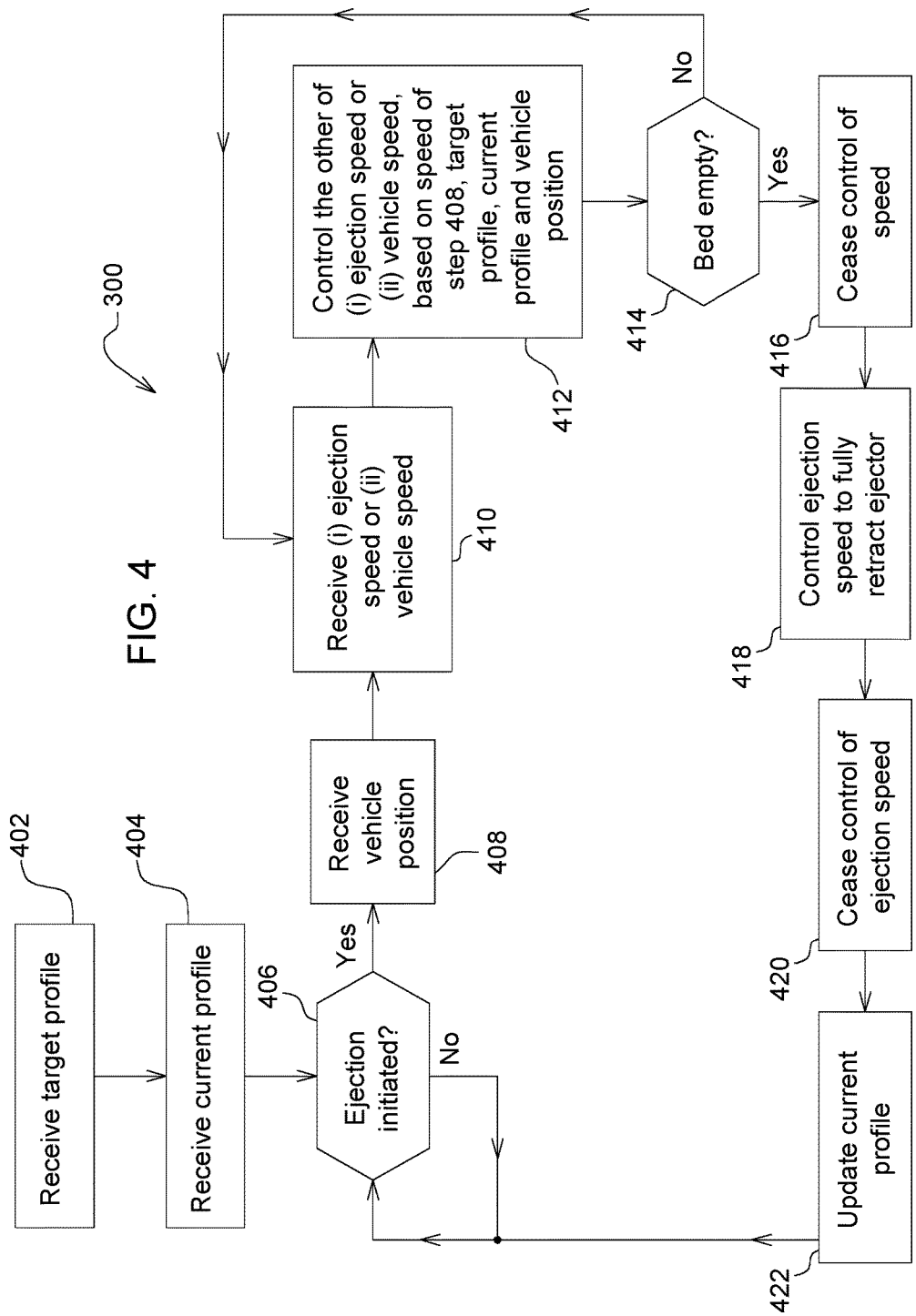
FIG. 4 is a flowchart of an alternative system and method for ejecting material from the work vehicle.

FIG. 4 illustrates a flowchart of an alternate control system 400 that the controller 138 may execute in order to spread material at an unloading area based on a target profile and a current profile. In step 402, the controller 138 receives a target profile. In step 404, the controller 138 receives a current profile. The controller 138 may receive the current profile in the same manner that it receives the target profile, or it may instead determine the current profile based on a series of vehicle positions, as described further with regard to step 422.

In step 406, the controller 138 determines whether an ejection has been initiated such that an ejection mode consisting of steps 408, 410, 412, and 404 should be entered. If an ejection has not been initiated, the controller 138 may loop through step 406 until an ejection is initiated.

If an ejection is initiated, the controller 138 performs step 408 next where it receives the position of the ADT 100, or receives the position of a positioning system and applies to offset to determine the position of the ADT 100. Next, the controller 138 performs step 410, where it receives one of an ejection speed or a vehicle speed. In step 412, the controller 138 uses the speed received in step 410, the target profile received in step 402, the current profile received in step 404, and the vehicle position received in step 408 to control the other of the ejection speed or vehicle speed.

In step 412, the controller 138 may compare the target profile and the current profile to determine a distance or thickness of material necessary for the current profile to reach the target profile, such as distance 210a of FIG. 2. Based on this comparison, the controller 138 may determine a target thickness for the unloading process, which may be the distance or a portion of the distance. Once this target thickness is determined, the control speed for the ejector 116 or the ADT 100 can be determined, as described above with regard to step 310 of the control system 300. The controller 138 can then control the speed of the ejector 116 or the ADT 100 according to this control speed.

In step 414, the controller 138 determines whether the bed or bin 110 of the ADT 100 is empty, and loops control back through steps 408, 410, and 412 if is not empty, and proceeds to step 416 if it is empty. In step 416, the controller 138 ceases to control the speed of the ejector 116 or the ADT 100.

In optional steps 418 and 420, the controller 138 controls the speed of the ejector 116 to fully retract it and prepare the bin 110 for another loading cycle. After step 414, the ejector 116 will typically be in a fully extended or unloaded position, toward its rearward end of travel on the ADT 100. The controller 138 may retract the ejector 116 until it reaches it forward end of travel position, or the fully retracted or loaded position. Once at this position, the controller 138 may cease its control of ejector 116, and proceed to step 422.

In step 422, the controller 138 may update the current profile based on a plurality of position signals for the ADT 100. As the ADT 100 or other work vehicles on the site perform work and adjust the ground surface in the unloading area, the actual profile of the work area may begin to differ from the current profile received in step 404. However, as the ADT 100 traverses the unloading area, the controller 138 may be provided with a series of positions by positioning system 137 and these positions may reflect the actual profile of the work area and may be used to update the current profile used by the controller 138. Specifically, this series of positions may be formed into a sensed profile 206, as shown in FIG. 2. This sensed profile 206 may require an offset or adjustment based on the position of the positioning system 137 relative to the ground surface, but, once adjusted, may indicate an updated actual profile for the ground surface and may be used to update the current profile received in step 404 to reflect changes made to the unloading area. This may be particularly useful in situations where the current profile may have been inaccurate or incomplete, or may become out of date if the ADT 100 is making multiple unloading passes at the unloading area.

After the controller 138 has updated the current profile based on the sensed profile 206, the control system 400 returns to step 406 to await the next ejection sequence. Provision may be made for the performance of steps 402 and 404 if updates to the target profile or the current profile are desired.

The contents of U.S. application Ser. No. 15/006,369, "Ejector control for spreading material"), is hereby incorporated by reference herein.

Without in any way limiting the scope, interpretation, or application of the claims appearing below, a technical effect of one or more of the example embodiments disclosed herein is to provide or use a work vehicle with an ejector body to unload material across a desired distance or at a desired thickness in an automated or semi-automated manner. Another technical effect of one or more of the example embodiments disclosed herein is to provide or use a work vehicle with an ejector body to begin an unloading cycle at a certain position. Another technical effect of one or more of the example embodiments disclosed herein is to provide or use a work vehicle with an ejector body to unload material across a desired distance or at a desired thickness in an automated or semi-automated manner utilizing certain set parameters, such as target vehicle speeds, target ejection speeds, and target ejection rates.

As used herein, "controller" is intended to be used consistent with how the term is used by a person of skill in the art, and refers to a computing component or a collection of computing components with processing, memory, and communication capabilities which is utilized to control one or more other components. In certain embodiments, a controller may also be referred to as a control unit, vehicle control unit (VCU), engine control unit (ECU), transmission control unit (TCU), or hydraulic, electrical or electrohydraulic controller. In certain embodiments, a controller may be configured to receive input signals in various formats (e.g., hydraulic signals, voltage signals, current signals, CAN messages, optical signals, radio signals), and to output command signals in various formats (e.g., hydraulic signals, voltage signals, current signals, CAN messages, optical signals, radio signals). Unless described otherwise, the term "controller" is intended to mean both a signal controller and a collection of cooperating controllers.

Embodiments of the present disclosure may be described herein in terms of logical block components and various steps, including in flow charts. It should be appreciated that such block components and steps may be realized by any number of appropriately-configured hardware, software, and/or firmware components. For example, an embodiment of the present disclosure may employ various integrated circuit components (e.g., memory elements, digital signal processing elements, logic elements, look-up tables) which may carry out a variety of logic and steps under the control of one or more microprocessors or other control devices. In addition, those skilled in the art will appreciate that embodiments of the present disclosure may be practiced in conjunction with any number of systems, and that the ADT 100 described herein is merely one exemplary embodiment of the present disclosure. Further, although certain embodiments of the disclosure are illustrated as a flowchart, the disclosure is not limited to such steps and the order of steps of presented, and it would be well within the skill of one of ordinary skill in the art to reorder, combine, or split many of the steps and achieve the same result.

As used herein, "e.g." is utilized to non-exhaustively list examples, and carries the same meaning as alternative illustrative phrases such as "including," "including, but not limited to," and "including without limitation."

As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C).

As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

For the sake of brevity, conventional techniques and arrangements related to signal processing, data transmission, signaling, control, and other aspects of the systems disclosed herein may not be described in detail. Furthermore, the connecting lines shown in the various figures contained herein are intended to represent example relationships and/or connections between the various elements (e.g., electrical power connections, communications, physical couplings). It should be noted that many alternative or additional relationships or connections may be present in an embodiment of the present disclosure.

While the present disclosure has been illustrated and described in detail in the drawings and foregoing description, such illustration and description is not restrictive in character, it being understood that illustrative embodiment(s) have been shown and described and that all changes and modifications that come within the spirit of the present disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

What is claimed is:

1. A device for controlling an ejector of a work vehicle with an ejector body, the device comprising:
    a controller configured to:
        receive a target profile, the target profile indicative of a target topography for an area of land, the target profile different from a current topography for the area of land, the target topography and the current topography each describing a three-dimensional surface for the area of land;
        receive a position signal indicative of a position of the work vehicle on the area of land;
        enter an ejection mode upon receipt of an ejection command; and
        control, while in the ejection mode, based on both the position signal and the target profile, at least one of a speed of the ejector and a speed of the work vehicle, in order to eject material from the ejector body onto the area of land so as to raise the current topography toward the target profile.

2. The device of claim 1, wherein the controller is further configured to:
    receive a vehicle speed signal indicative of a speed of the work vehicle over the area of land;
    control, while in the ejection mode, based on the position signal, the target profile, and the vehicle speed signal, the speed of the ejector in order to eject material from the ejector body onto the area of land so as to raise the current topography toward the target profile.

3. The device of claim 1, wherein the controller is further configured to:
    receive an ejector speed signal indicative of a speed of the ejector;
    control, while in the ejection mode, based on the position signal, the target profile, and the ejector speed signal, the speed of the work vehicle in order to eject material from the ejector body onto the area of land so as to raise the current topography toward the target profile.

4. The device of claim 1, wherein the controller is further configured to:
    receive an ejector position signal indicative of a position of the ejector from an ejector position sensor; and
    exit the ejection mode and cease commanding movement of the ejector based on the ejector position signal.

5. The device of claim 4, wherein the controller is further configured to exit the ejection mode when the ejector position signal indicates the ejector has reached an end of travel.

6. The device of claim 5, wherein the controller is further configured to receive a voltage signal from the ejector position sensor, wherein the ejector position sensor is at least one of a linear transducer, a cylinder displacement encoder, a pressure sensor, and a pressure switch.

7. The device of claim 1, wherein the controller is further configured to:
    determine a distance traveled by the work vehicle based on a plurality of received position signals; and
    determine when to exit the ejection mode and cease commanding movement of the ejector based on the distance traveled by the work vehicle since the controller entered the ejection mode.

8. The device of claim 1, wherein the controller is further configured to:
    receive a start position indicative of a first position on the area of land;
    receive an end position indicative of a second position on the area of land;
    generate an ejection command based on a comparison of the position signal and the start position; and
    determine when to exit the ejection mode and cease commanding movement of the ejector based on a comparison of the position signal and the end position.

9. The device of claim 1, wherein the controller is further configured to receive the ejection command from an input actuated by an operator of the work vehicle.

10. A device for controlling an ejector of a work vehicle with an ejector body, the device comprising:
a controller configured to:
receive a target profile, the target profile indicative of a target topography for an area of land, the target profile different from a current topography for the area of land, the target topography and the current topography each describing a three-dimensional surface for the area of land;
receive a position signal indicative of a position of the work vehicle on the area of land;
determine, based on the target profile and the position signal, a distance from the current topography at the position of the work vehicle to the target profile at the position of the work vehicle;
enter an ejection mode upon receipt of an ejection command; and
control, while in the ejection mode, based on the distance, at least one of a speed of the ejector and a speed of the work vehicle, in order to eject material from the ejector body onto the area of land so as to raise the current topography toward the target profile.

11. The device of claim 10, wherein the controller is further configured to:
receive a vehicle speed signal indicative of a speed of the work vehicle over the area of land; and
control, while in the ejection mode, based on the distance and the vehicle speed signal, the speed of the ejector in order to eject material from the ejector body onto the area of land so as to raise the current topography toward the target profile.

12. The device of claim 10, wherein the controller is further configured to control, while in the ejection mode, based on the distance, the speed of the ejector and the speed of the work vehicle in order to eject material from the ejector body onto the area of land so as to raise the current topography toward the target profile.

13. The device of claim 10, wherein the controller is further configured to:
receive an ejector position signal indicative of a position of the ejector from an ejector position sensor; and
exit the ejection mode and cease commanding movement of the ejector based on the ejector position signal.

14. The device of claim 13, wherein the controller is further configured to exit the ejection mode when the ejector position signal indicates the ejector has reached an end of travel.

15. The device of claim 10, wherein the controller is further configured to:
store a plurality of received position signals; and
determine a current profile based on the stored plurality of position signals, the current profile indicative of the current topography for the area of land.

16. The device of claim 10, wherein the controller is further configured to:
determine a distance traveled by the work vehicle based on a plurality of received position signals; and
determine when to exit the ejection mode and cease commanding movement of the ejector based on the distance traveled by the work vehicle since the controller entered the ejection mode.

17. The device of claim 10, wherein the controller is further configured to:
receive a start position indicative of a first position on the area of land;
receive an end position indicative of a second position on the area of land;
generate an ejection command based on a comparison of the position signal and the start position; and
determine when to exit the ejection mode and cease commanding movement of the ejector based on a comparison of the position signal and the end position.

18. A method of operating a work vehicle with an ejector body, the method comprising the steps of:
receiving a target profile, the target profile indicative of a target topography for an area of land, the target profile different from a current topography for the area of land, the target topography and the current topography each describing a three-dimensional surface for the area of land;
receiving a position signal indicative of a position of the work vehicle on the area of land;
determining, based on the target profile and the position signal, a distance from the current topography at the position of the work vehicle to the target profile at the position of the work vehicle;
entering an ejection mode upon receipt of an ejection command at a controller; and
controlling, with the controller, in the ejection mode, based on the distance, at least one of a speed of the ejector and a speed of the work vehicle in order to eject material from the ejector body onto the area of land so as to raise the current topography toward the target profile.

19. The method of claim 18, further comprising the step of determining the current topography at the position of the work vehicle based on the received position signal.

20. The method of claim 18, further comprising the step of updating the current topography based on a plurality of received position signals.

* * * * *